United States Patent [19]

Fancy et al.

[11] 4,227,072

[45] Oct. 7, 1980

[54] REFERENCE SIGNAL CIRCUIT

[75] Inventors: Thomas A. Fancy, Westminster; Donald F. Behringer, Ashburnham, both of Mass.

[73] Assignee: General Electric Company, Schenectady, N.Y.

[21] Appl. No.: 928,246

[22] Filed: Jul. 26, 1978

[51] Int. Cl.$^2$ .................. G06M 3/12; G06M 3/14
[52] U.S. Cl. .................... 235/92 CA; 235/92 EV; 235/92 DE; 235/92 CT; 318/305
[58] Field of Search ....... 235/92 EV, 92 MP, 92 DE, 235/92 CA, 92 CT, 92 PL; 318/305; 364/119

[56] References Cited
U.S. PATENT DOCUMENTS

| 3,869,019 | 3/1975 | Cardani | 235/92 MP |
| 3,968,401 | 7/1976 | Bryant | 235/92 EV |
| 4,025,762 | 5/1977 | Rossi et al. | 364/119 |

Primary Examiner—Joseph M. Thesz
Attorney, Agent, or Firm—James W. Mitchell; John F. Ahern

[57] ABSTRACT

In the field of closed loop control systems, a reference signal input is compared with a feedback signal to provide an error signal which then initiates corrective action until the feedback signal duplicates the reference signal. Hence, the reference signal may be appreciated as the set point at which the control system should operate. The disclosure relates to a manual input reference signal circuit which may be used to input a desired reference speed signal into a control system circuit for a prime mover. Provision is made for both local and remote manual signal input and priority logic is included for selecting the most appropriate reference signal. Inhibit logic dictates the floor and ceiling for the range of prime mover operation.

4 Claims, 1 Drawing Figure

4,227,072

REFERENCE SIGNAL CIRCUIT

BACKGROUND OF THE INVENTION

The invention is directed to control systems, in general; and, in particular to a speed reference circuit for deployment with a control system suitable for directing a prime mover.

In a control system for a prime mover, a speed reference signal representing a desired prime mover speed is compared with a speed feedback signal representing an actual prime mover speed to produce an error signal representative of the lead or lag difference between the two signals which error is then used to direct corrective action in order to minimize the difference between the reference speed and the actual speed. There are numerous ways of introducing a reference signal including analog and digital circuitry. One analog system for introducing a reference signal simply comprises a mechanical dial which applies a voltage level equivalent to a desired speed to the circuit through a potentiometer or the equivalent thereof. Likewise, a digital reference signal could be input into a system by means of a variable control oscillator.

Circumstances may require that an input signal be available from a remote location such as a control room and a local site such as a panel adjacent the rotating machine. In the present invention such a dual panel arrangement is available and one aspect of the present invention is to provide priority logic so that the most appropriate reference signal is applied to the control system. The reference input signal is applied through either a remote or local keyboard. The input signal will either be an increase log or ramp; or, a decrease jog or ramp. The output of the priority logic is input into an an up-down counter through either an up count channel or a down count channel. The output of the up-down counter is then input into the speed control circuit of the prime mover.

During normal operation it is desirable to limit the applied reference signal to a range of standstill to high speed stop. This range is secured within the reference signal circuit by applying inhibit logic to the up count and down count channels respectively so that the inhibit logic is connected to the output of the up-down counter by means of signal feedback loops. Means are provided to override the high speed inhibit during the instance of overspeed test.

Reset circuitry and logic is provided so that the high speed inhibit is reset if an overspeed test is aborted and further reset provision is made to reset the up-down counter upon the occurrence of a turbine trip.

OBJECTS OF THE INVENTION

Hence, it is an object of this invention to provide an improved reference signal circuit which includes remote and local station manual input capability.

It is another object of this invention to provide priority logic for processing simultaneous input of command signals in order to achieve the most appropriate reference signal.

It is a further object of this invention to provide signal inhibitors within the reference signal circuit to contain the input signal within the framework of desired operating procedures.

Other objects and advantages will become apparent from the following detailed description of the invention and the novel features will be particularly pointed out hereinafter in the claims.

SUMMARY OF THE INVENTION

The invention primarily is an electronic circuit for introducing a reference signal into a control system. It is applicable, in one example, as a means for introducing a speed reference signal into a control system for a prime mover. One unique aspect of the invention is the priority logic for selecting a reference signal from two simultaneous manual inputs in accordance with a predetermined order. Another unique aspect of the invention is the use of inhibit circuitry to avoid an excessive reference output signal. The priority logic signal output is a pulse form in either the count up or count down direction. The pulse output is input into an up-down counter having a binary output. The output of the up-down counter may then be conditioned into a signal which is compatible with the control system.

DETAILED DESCRIPTION OF THE INVENTION

Figure 1:
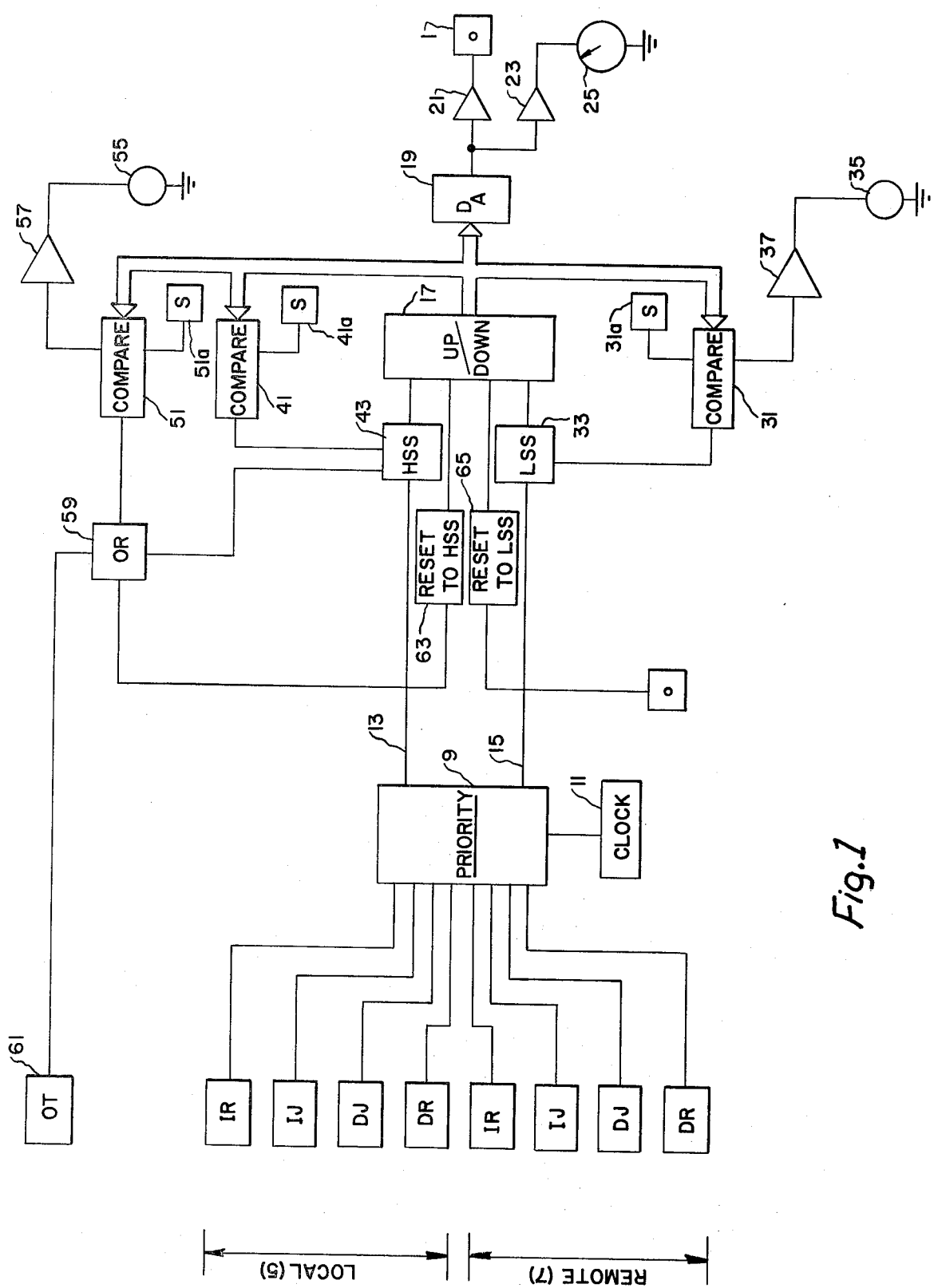
FIG. 1 is a schematic diagram of the entire manual reference signal circuit.

In U.S. Pat. No. 4,025,762 issued May 24, 1977 and assigned to the assignee of the present invention, a control system for a prime mover is shown in FIG. 1. A brief reading of FIG. 1 will illustrate to the routineer in the art the purpose and effect of adding a reference speed signal and a speed feedback signal so as to produce an error signal which is then applied to a valve positioning circuit. The reference speed signal may either be a manually set reference signal or an automatically generated reference signal depending on the position of ganged switches 67 and 69 in that patent's drawing. The output of the present invention at pin 1 is analogous to the input signal which is provided through switch 67 in the aforementioned patent.

Referring to FIG. 1 for purposes of illustrating the present invention, a local keyboard 5 and a remote keyboard 7 provide input information into a priority logic circuit 9. Each keyboard is further divided into increase ramp (IR), decrease ramp (DR), increase log (IJ) and decrease log (DJ) functions. These functions in cooperation with a clock input II into the priority logic 9 will provide a pulsed output in either a count up channel 13 or a count down channel 15. The priority logic is shown in more detail in FIG. 2 and will be further explained.

The respective count up and count down outputs of priority logic 9 are fed into an up-down counter 17. The up-down counter may be a ten bit counter, as for example a Texas Instruments, Inc. #74192, used to generate a digital number representing the reference signal setpoint. The digital number output is continuously converted to an analog voltage by a digital to analog converter (D/A) 19. The output of the digital to analog converter is input into a buffer amplifier 21 immediately upstream from output pin 1 whereupon the signal may be identified as the speed reference voltage. The output of D/A converter 19 is also input into a signal amplifier 23, the output of which is connected to a display meter 25 which indicates the reference speed set.

There are three feedback loops which utilize the binary output of the up-down counter 17. A first feedback loop comprises a low speed stop comparator 31 which compares the reference output from up-down counter 17 with a floor value set input into the comparator as, for example, through adjustment digital switch 31A. In the event that the comparator input signal exceeds the set floor value in the negative direction, then there will be an output signal into the low speed inhibit 33. The low speed inhibit is shown in block diagram but as would be known to one of ordinary skill in the art could comprise a NAND gate having multiple inputs. For example; assuming inputs from the priority logic 9 (count down channel) and an input from the low speed comparator 31 as long as there was one input low there would be an output. However, if the low speed comparator goes high, then the output of the NAND gate goes low and inhibit exists. A second output from the comparator 31 is a warning signal to the operator visible in light 35 driven by amplifier 37. The purpose of the low speed stop feedback loop is twofold. First, it simply indicates that the floor value has been reached and inhibits any further countdown signal. On the other hand, the low speed stop inhibit circuitry prevents the up-down counter 17 from cycling through the floor into the high speed range.

A second feedback loop comprises an overspeed comparator 41 which may be preset to provide an output signal to a count up inhibit device 43. The comparator may be preset by means of hard-wiring or a digital switch 41A and would be set to about 125 percent of turbine rated speed. As the equivalent binary representation of that speed comes through the up-down counter further count up would be inhibited.

The third feedback loop is the high speed stop inhibit which includes a high speed stop comparator 51 which may be preset to provide an output signal whenever the input reference speed exceeds about 100 percent of rated speed. The input high speed stop preset value may be through adjustment digital switch 51A. If the preset value is exceeded, then an output signal will be generated to switch on light 55 through amplifier 57. Hence, there are indications of high speed stop and low speed stop actuations through comparators 51 and 31, respectively.

A second output of the high speed stop comparator is input into overspeed test logic 59. The logic basically is an OR gate (not shown) having an input from an overspeed test enable (OT) button 61 and a second input from the high speed comparator 51. A low output from the OR gate causes inhibit. Normal inputs to the OR gate are high from the high speed comparator and low from the OT button. If the high speed comparator goes low, then the OT button can prevent inhibit when pushed. The output of the OR gate to the inhibit device will cause inhibit if the high speed stop is reached unless an override (OT) is pushed whereupon the inhibit is governed by the overspeed signal from comparator 41. The overspeed test logic is connected to the high speed stop inhibit circuit 43 which also is a multiple input NAND gate similar in description to block 33.

In addition to the foregoing, further logic is provided in the form of a reset device 63 which is able to reset the up-down counter to high speed stop if an overspeed test is aborted without going to trip. A second reset device 65 is provided to reset the up-down counter to standstill operation if a trip has occurred.

Figure 2:
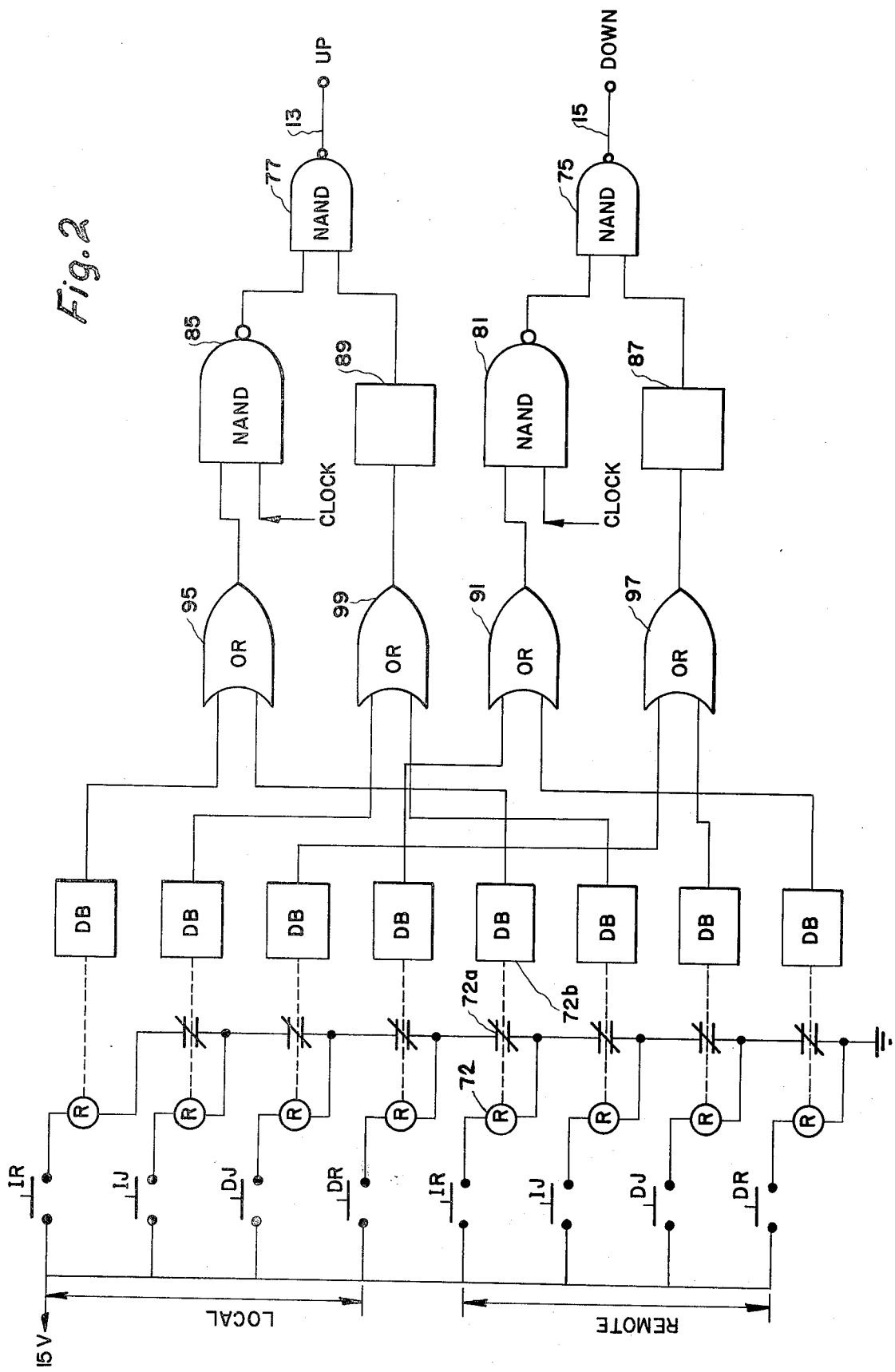
FIG. 2 is a schematic diagram of the priority logic.

Referring now to FIG. 2, circuitry is shown which is suitable for incorporation into priority logic 9 to show how the appropriate push button signal is translated into either a count up or count down pulse. The input signal from only one push button may be applied to the up-down counter and the selected order is from bottom to top as shown in FIG. 2. This is because as a lower push button is actuated its associated relay electrically isolates the upstream buttons by means of the actuated button relay and its associated series switch. For example, if the remote increase ramp (IR) switch is actuated it will cause relay 72 to open normally closed switch 72A and actuate its associated debounce circuit 72B. The debounce circuit is a bi-stable flip-flop actuated by the appropriate relay. If switch 72A is open it effectively de-energizes the upstream or upper portion of the push button array. In this way, a lower button can override any input of an upper button. The circle following each push button indicates a relay whereas the box represents a debounce circuit.

Both the count down and count up channels are each preceded by NAND gates 75 and 77, respectively which receive inputs from an upstream clock NAND gate 81 and 85 and a one shot multi-vibrator 87 and 89. The clocked NAND gates received a clocked input from clock 11 to time the ramp inputs whereas the one shots provide the jog function. Upstream from NAND gates 81 and 85, and multi-vibrators 87 and 89 are OR gates 91, 95, 97 and 99 which receive inputs from the debounce circuits and organize them into the functions decrease ramp, decrease jog, increase ramp, increase jog respectively.

The invention operates in the following manner. The object of the invention is to provide a manually set reference signal into a control system circuit. The manual reference signal may be input from either a local or remote station and may either be a ramp input comprising a series of pulses or a jog input comprising one discrete pulse at a time. Priority logic is provided to differentiate between the possible two simultaneous inputs and also to apply either a jog or ramp characteristic to the output signal of the priority logic 9. Clock 11 provides the timing function to the priority logic. The output signal from the priority logic will either be a count up signal in count up channel 13 or a count down signal in count down channel 15. A signal from either channel 13 or channel 15 is applied to the input terminals of up-down counter 17 where it is converted into a binary output which then becomes the reference signal. The reference signal may be converted in a digital to analog converter 19 to a signal suitable for use in an analog control system. Meter 25 will indicate the level of the signal being applied. There are three feedback loops which govern the input to the up-down counter. A low speed stop feedback loop which includes comparator 31 and inhibit circuit 33 provides a floor to the range of signals which may be applied through the up-down counter. This also prevents low range to high range cycling of the counter.

A second feedback loop is the overspeed feedback loop comprising comparator 41 and inhibit circuitry 43. The overspeed comparator is set at about 125 percent of rated signal and the purprose of the loop is to provide reference signal governing when an overspeed test is being carried on. Furthermore, the overspeed comparator provides a redundant line of defense of a runaway reference signal.

A third feedback loop includes a high speed stop comparator 51 which may be set at 100 percent of system rated speed. The high speed stop comparator provides a first line of defense against runaway reference signal by maintaining the maximum applied count up signal at the high speed stop. However the high speed stop may be disengaged if an overspeed test is desired by means of overspeed test logic provided in box 59 enabled by button 61. The overspeed test logic blocks the high speed stop signal to the inhibit circuitry 43 whereas the overspeed stop comparator 41 still maintains an upper limit on the count up signal. The reset logic 63 will reset the up-down counter to the high speed stop if an overspeed test is aborted without trip. If a trip does occur the reset logic 65 will reset the up-down counter to the floor value.

While there has been shown what is considered, at present, to be the preferred embodiment of the invention, other modifications may occur to those skilled in the art; and, it is intended to cover in the appended claims all such modifications as fall within the true spirit and scope of the invention.

What is claimed is:

1. A speed reference signal circuit for providing a desired speed reference signal into a speed control system comprising:
   a keyboard for introducing the desired speed signal into the reference signal circuit;
   priority logic for determining an up count or down count signal;
   an up-down counter for receiving up counts and down counts and providing an output signal representative of desired speed;
   an up count channel and a down count channel interconnecting the priority logic with said up-down counter;
   a first feedback loop interconnecting the up-down counter output with down count inhibit means in said down count channel; said first feedback loop including a comparator for comparing said counter output with a preset low speed value;
   a second feedback loop interconnecting the up-down counter output with up count inhibit means in said up count channel; said second feedback loop including a comparator for comparing said counter output with a preset overspeed value;
   a third feedback loop interconnecting the up-down counter output with the up count inhibit means in said up count channel; said third feedback loop including a comparator for comparing said counter output with a preset high speed value; and,
   high speed override means interconnecting the high speed value comparator with the up count inhibit means, said override means having an overspeed test enabling input whereby the down count inhibit will prevent further decrement of the up-down count at a preselected low speed value; the up count inhibit will prevent further increment of the up-down counter at a preselected overspeed value; and, the up count inhibit will prevent further increment of the up-down counter at a preselected high speed value below said overspeed value unless there is an enabling input into said override means.

2. A reference signal circuit for providing a desired speed reference signal into a speed control system comprising:
   a keyboard for introducing the desired speed signal into the reference signal circuit;
   priority logic for determining an up count or down count signal;
   an up-down counter for receiving up counts and down counts and providing a binary output representing a desired speed reference signal;
   an up count channel and a down count channel interconnecting the priority logic with said up-down counter;
   up count inhibit means in said up count channel wherein the up count inhibit means comprises:
      a high speed signal feedback loop connected at the output end of the up-down counter including a high speed signal comparator having a preset ceiling reference and connected to the output of said up-down counter;
      up count inhibit logic at the output end of said high speed signal comparator and receiving up counts from said priority logic whereby up counts to the up-down counter are inhibited whenever the output of the up-down counter equals the ceiling reference set;
      means for overriding the high speed signal comparator output to the up count inhibit logic including overspeed test logic interposed between the output of said high speed signal comparator and the up count inhibit said overspeed test logic including an OR gate; and, down count inhibit means in said down count channel.

3. A reference signal circuit for providing a desired speed reference signal into a speed control system comprising:
   a keyboard for introducing the desired speed signal into the referenced signal circuit;
   priority logic for determining an up count or down count signal;
   an up-down counter for receiving up counts and down counts and providing a binary output representing a desired speed reference signal;
   an up count channel and a down count channel interconnecting the priority logic with said up-down counter;
   up count inhibit means in said up count channel;
   down count inhibit means in said down count channel;
   means for testing the speed control system to an overspeed condition; and,
   means for resetting the up-down counter to a preset high value if there is no trip during the overspeed test.

4. The reference signal circuit recited in claim 3 comprising:
   means for resetting the up-down counter to a preset low value if a trip occurs.

* * * * *